Feb. 24, 1953     A. H. SCHOOLEY     2,629,867
RANGE APERTURING DEVICE
Filed April 17, 1943
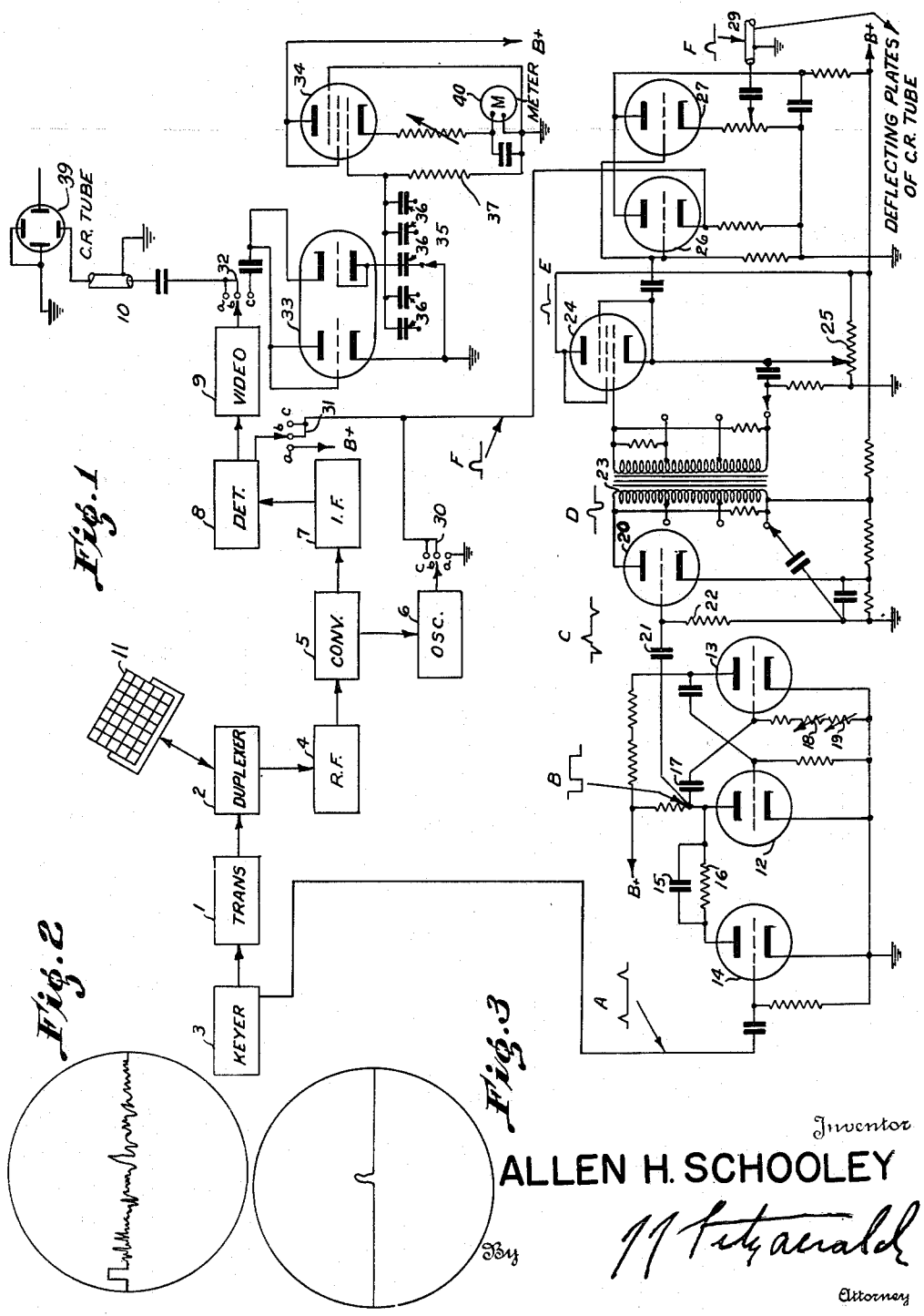
Inventor
ALLEN H. SCHOOLEY Patented Feb. 24, 1953

2,629,867

UNITED STATES PATENT OFFICE 2,629,867

RANGE APERTURING DEVICE

Allen H. Schooley, Washington, D. C.

Application April 17, 1943, Serial No. 483,495

12 Claims. (Cl. 343—13)

(Granted under Title 35, U. S. Code (1952), sec. 266)

This invention relates to a means for producing a first series of energy pulses of adjustable pulse width and in adjustable spaced alternation with a second series of pulses and more particularly to a means for eliminating all but a selected echo on the face of a cathode ray tube used in radio obstacle detection apparatus. This invention also relates to a means for enabling low intensity echoes to be readily distinguished from random noises.

In general, the results of the ordinary system of radio obstacle detection are quite satisfactory insofar as the system itself is concerned, since it provides an early warning of the presence of remote obstacles. These early warnings generally appear on the face of a cathode ray tube in the form of reflected energy pulses occurring sometime after the transmission of the original energy pulse itself. Consequently, it is customary for cathode ray tubes used in radio obstacle detection apparatus to contain distance graduations in feet, yards or miles thereby providing a continuous indication of the obstacle range. The accuracy of the obstacle range measurement made by this system is limited, however, since inevitable discrepancies will exist in the graduations of the cathode ray tube itself, in addition to the fact that a considerable amount of ground or water echoes are generally present thereby making it difficult to scrutinize the echo. As a result, ordinary radio obstacle detection apparatus will not suffice for precision range measurements such as those which are necessary for fire control purposes. Another common drawback which is often experienced while using ordinary radio echo gear is the fact that low intensity echoes often become lost in random noises thereby making it extremely difficult to distinguish between noise and echo.

It is an object of this invention to provide a means for periodically unblocking a normally blocked pulse receiver.

It is another object of this invention to provide a means for periodically unblocking a normally blocked pulse receiver at the proper time, and for the proper time duration to allow reception of any selected pulse reflection with the exclusion of all extraneous reflections.

It is another object of this invention to provide a means for converting ordinary radio obstacle detection apparatus into precision range finding apparatus.

It is another object of this invention to provide a means used in conjunction with a pulse receiver to facilitate the distinction of low intensity echoes over ambient noises.

Other objects of the present invention will become apparent upon a careful consideration of the following description when taken together with the accompanying drawings, in which:

Fig. 1 is a schematic diagram partly in block and partly in detail of a preferred embodiment of the present invention;

Fig. 2 is a face view of an oscilloscope used in ordinary radio obstacle detection apparatus and illustrating a typical condition of operation, and Fig. 3 is a face view of an oscilloscope used in the present radio detection apparatus, illustrating my novel condition of operation.

Referring now to Fig. 1, the circuit shown therein comprises in combination, a means for eliminating all but a chosen echo on the oscilloscope of a radio detection system and also to a means for distinguishing low intensity echoes from random noises. Reference character 1 pertains to a pulse transmitter which is characterized in the ability to produce a series of periodic energy pulses, 2 a duplexing device which is now well known to the art and provides a means for enabling transmission and reception to be carried on through a common antenna 11, 3 a keyer which is generally provided for keying the transmitter 1 in the proper sequence, 4 the radio frequency amplifier stage of the receiver, 5 the converter, 6 the local oscillator, 7 the intermediate frequency amplifier, 8 the detector, 9 the video amplifier and 10 a coaxial transmission line connecting the output of the video amplifier to the oscilloscope indicated in general at 39. The miniature voltage oscillograms A, B, C, D, E and F drawn throughout the circuit all contain the same time origin and represent the voltage wave form at the various specified points. Triodes 12 and 13 comprise a multivibrator which is keyed by triode 14 in synchronism with the pulse transmitter 1 with a positive pulse as shown in oscillogram A. As tube 14 keys the multivibrator the anode voltage of triode 12 drops sharply negative to charge condenser 17 negatively and consequently holds triode 13 at cut-off or triode 12 at reduced anode voltage for a period equal to the time required for the charge on condenser 17 to leak off through potentiometers 18 and 19. After the charge on condenser 17 has leaked off to a definite value the anode voltage of triode 12 will return to normal and remain there until the pulse transmitter 1 is keyed again. In other words the present multivibrator is of the free running type having the required time constant circuits in order that it may be locked in synchronism with the pulse transmitter 1. The anode voltage variations of triode 12 with respect to time are shown more clearly in oscillogram B. The substantially square wave output of the multivibrator is fed into the clipping amplifier 20 through a small time constant circuit comprising condenser 21 and resistance 22 which allows condenser 21 to pass a current only when there is a change in a voltage. Thus as the anode voltage of triode 12 drops sharply, a negative voltage pulse will be formed, followed in time by a positive voltage pulse which corresponds to the sharp rise in anode voltage. These voltage variations are shown more clearly in oscillogram C. It therefore becomes obvious that potentiometers 18 and 19 can cause the positive voltage pulse of oscillogram C to occur at any time between successive transmitted pulses since they control the time interval during which the anode voltage of triode 12 is sustained at a reduced value. The clipping amplifier 20 contains a strong negative bias and therefore allows only positive inputs to effect the draining of plate current, consequently as the sharp positive pulse of oscillogram C strikes the grid of amplifier 20 a sharp surge of plate current flows through the primary winding of transformer 23 thereby producing a substantially single cycle voltage as shown in oscillogram D, the period of which is a function of the natural period of the transformer. The output of transformer 23 is fed into a class "B" amplifier 24 which eliminates the negative half-cycle grid swing. The positive output of this amplifier as shown by oscillogram E and taken from the cathode circuit is fed into a pair of parallel cathode followers 26 and 27. The positive output of the cathode follower 27, as shown in oscillogram F, is fed through the coaxial line 29 to the deflecting plates of an auxiliary cathode ray tube in order that the general characteristics of the pulse, such as the width and amplitude may be studied. The width of this pulse may be controlled, both by changing the natural period of the transformer 23 with the variable taps and by changing the bias of the class "B" amplifier 24 with the potentiometer 25 thereby controlling the amount of usable amplitude of the input pulse, which varies inversely in width with amplitude, as shown in oscillogram D.

A control element, the control grid for instance, of the local oscillator 6 is connected to the contact-making arm of multiple throw switch 30 in such a manner that when the contact-making arm is in position $a$, a large grid bias resistor, for instance, is grounded out and the oscillator is normally maintained operative. But when the contact-making arm is held in either position $b$ or $c$ the large grid resistor is inserted in the circuit and the oscillator is maintained in a normally quiescent state except during the occurrence of the positive pulse output of the cathode follower 26. A control element, the screen grid for instance, of detector 8 is also connected to the contact-making arm of the multiple throw switch 31 in such a manner that when contact arm is in position $a$ the detector is normally maintained operative, but when the contact arm is held in either position $b$ or $c$ the detector is maintained in a normally blocked condition by virtue of the low voltage connection to the cathode of tube 26 except during the occurrence of the positive pulse output of the cathode follower 26. The output of the video amplifier 9 is also connected to the contact-making arm of the multiple throw switch 32 in such a manner that when the contact arm is held in either position $a$ or $b$ the output is applied to the deflecting plates of a cathode ray tube 39 through the coaxial line 10. It therefore becomes apparent, that when all multiple throw switches 30, 31 and 32 are engaged in an $a$ position, normal operation of the receiver will ensue; viz., the oscilloscope will show an indication of the transmitted pulse followed by the time base sweep and a series of echoes. The indications appearing on the oscilloscope under this condition of operation are more clearly shown in Fig. 2. With all multiple throw switches held in a $b$ position, the receiver will be maintained in a normally blocked condition by virtue of the connection of the oscillator 6 and detector 8 to the cathode of tube 26 except for the occurrence of the output from the cathode follower 26. Thus all echoes except those arriving during the time occurrence of the output from the cathode follower will be blocked from the oscilloscope as shown in Fig. 3. Consequently, potentiometers 18 and 19 can be used to follow any one echo or group of echoes, depending upon the pulse width of the output from the cathode follower, across the entire range of the apparatus. Thus, these potentiometers can be calibrated in suitable range units and thereby provide a means for measuring both directly and accurately the range of any obstacle within the range of the apparatus. The $c$ position of the multiple throw switch 32 is connected to an integrator circuit, comprising double diode 33 and direct current amplifier 34. The output of the double diode 33 contains a multiple throw switch 35, having a plurality of condensers 36 connected thereto, thereby providing a means for regulating the time constant of the coupling circuit between the double diode and direct current amplifier. The accumulative charge on the condenser 36 with which the contact-making arm of switch 35 is engaged, will control the bias on amplifier 34 which will in turn control the flow of cathode current and consequently the deflection of a cathode meter 40. Thus with all multiple throw switches 30, 31 and 32 held in a $c$ position the operation of the receiver will be identical to that when all switches were held in a $b$ position except the output of the video amplifier will be fed into the integrator circuit. Consequently an echo coming from a remote obstacle will have a consistent rate of recurrence which will provide condenser 36 with a constant rate of charge and discharge to provide a constant bias for the direct current amplifier 34 thereby causing a steady current to flow in the cathode circuit and thus a steady deflection of a cathode meter; while random noises will charge condenser 36 irregularly and consequently cause an irregular deflection of the cathode meter depending upon the time constant comprising condenser 36 and resistor 37. This provides a very accurate and simple means of distinguishing low intensity echoes from random noises.

Although I have shown and described a specific embodiment of the present invention, I am fully aware of the many modifications possible thereof. Therefore, this invention is not to be restricted except insofar as is necessitated by the prior art and the spirit of the appended claims.

The invention described herein may be manufactured and used by or for the Government of the United States of America for governmental purposes without the payment of any royalties thereon or therefor.

I claim:

1. In a radio obstacle detection system, a pulse transmitter and a pulse receiver having a converter, an oscillator and an output means, a first means for maintaining said oscillator in a normally operative condition whereby said receiver is normally maintained in a receptive condition, a second means for normally maintaining said oscillator inoperative and for periodically rendering said oscillator operative whereby said receiver is periodically rendered receptive to an energy reflection from any one selected obstacle, and a means for switching said receiver from the operating condition of the first means to the second means and vice versa.

2. In a radio obstacle detection system, a pulse transmitter and a pulse receiver having a converter, an oscillator, a detector and an output means, a means for maintaining said oscillator in a normally quiescent condition and a means for maintaining said detector in a blocked condition thereby maintaining said receiver inoperative, and a means for synchronously keying said oscillator and unblocking said detector both at any desired time during the interval between successive transmitted pulses thereby unblocking said receiver for an energy reflection from any one selected obstacle within the range of said receiver.

3. In a radio obstacle detection system, a pulse transmitter and a pulse receiver having a converter, an oscillator, a detector and an output means, a means for maintaining said oscillator in a normally quiescent condition and a means for maintaining said detector in a blocked condition thereby maintaining said receiver inoperative, and a means for synchronously keying said oscillator and unlocking said detector both at any desired time during the interval between successive transmitted pulses thereby unblocking said receiver for an energy reflection from any one selected obstacle within the range of said receiver and means for reading directly the range of said obstacle.

4. In a radio obstacle detection system, a pulse transmitter and a pulse receiver having a converter, an oscillator, a detector and an output means, a first means for maintaining said oscillator and said detector in a normally operative condition thereby maintaining said receiver normally operative, a second means for normally maintaining said oscillator and detector inoperative and for periodically rendering both said oscillator and said detector operative thereby rendering said receiver receptive to an energy reflection from any one selected obstacle within the range of said receiver and a means for switching the receiver from the operating condition of the first said means to the second said means.

5. In a radio echo obstacle detection system including apparatus for periodically transmitting short duration radio frequency impulses and for receiving echoes thereof reflected from remote obstacles, the method of distinguishing regularly recurring low intensity echoes from random noises in the receiver of the radio obstacle detection system, which comprises the steps of first holding the receiver of the system in a blocked condition and then unblocking the same during the interval between transmitted pulses for a short interval of time approximately equal to the transmitted pulse duration, integrating the echo energy received during said short interval of time to produce a direct voltage, and representing the magnitude of the result of said integration as an indication of the presence or absence of a regularly recurring echo.

6. In a radio echo obstacle detection system including apparatus for periodically transmitting short duration radio frequency impulses and for receiving echoes thereof reflected from remote obstacles, the method of distinguishing regularly recurring low intensity echoes from random noises in the receiver of the radio obstacle detection system, which comprises the steps of first holding the receiver of the system in a blocked condition and then unblocking the same during the interval between transmitted pulses for a short interval of time approximately equal to the transmitted pulse duration, and utilizing the energy from the incessant recurrence of an echo received during said short interval of time to produce a direct current voltage, causing said direct current voltage to control the uniformity of current flow through a current responsive device.

7. In a radio obstacle detection system including a transmitter for periodically transmitting short duration radio frequency impulses, a means for distinguishing regularly recurring low intensity echoes from random noises in the radio obstacle detection system comprising, a means for receiving energy reflections from a narrow band of ranges short in comparison to the entire range interval of the system, a signal integrator means connected to the output of said first named means and operative to provide an output signal independent of randomly recurring noise signals, and metering means connected to the output of said signal integrator.

8. A device adapted to have applied thereto a first series of pulses and a second series of pulses, the individual ones of which are time spaced from corresponding pulses of the first series by substantially equal periods, and to give an indication of the duration of said periods comprising means for forming a third series of voltage variations time spaced like the first series but in which the individual ones are displaced by a controllable and measurable period of time from corresponding pulses of the first series, a space current device to which pulses in the second and third series are applied and being normally cut off to such an extent that it becomes conducting to produce an output pulse only when a pulse of the second series overlaps in time a pulse of the third series, means for producing a direct voltage from the pulses in the output of such space current device, and means for indicating said direct voltage.

9. A device adapted to have applied thereto a first series of pulses and a second series of pulses, the individual ones of which are time spaced from corresponding pulses of the first series by substantially equal periods, and to give an indication of the duration of said periods comprising means for forming a third series of voltage variations time spaced like the first series but in which the individual ones are displaced by a controllable and measurable period of time from corresponding pulses of the first series, a space current device to which pulses in the second and third series are applied and being normally cut off to such an extent that it becomes conducting to produce an output pulse only when a pulse of the second series overlaps in time a pulse of the third series, means for producing a direct voltage from the pulses in the output of such space current device, and means for indicating said direct voltage, said means for producing a direct voltage comprising a condenser, a vacuum tube and a resistor connected to function as a peak vacuum tube voltmeter, the time constant of said condenser and resistor being considerably longer than the time between pulses in said first series.

10. In a radio echo obstacle detection system including apparatus for periodically transmitting short duration radio frequency energy impulses and for receiving the reflections thereof from remote obstacles, the combination of a normally blocked space current device connected to receive the reflected impulses, means unblocking said space current device for a short time interval approximately equal to the duration of the transmitted pulses once during the interval between each successive transmitted impulse, and signal integrator means producing a direct voltage from the output of said space current device, and means for indicating the magnitude of said direct voltage.

11. In a radio echo obstacle detection system including apparatus for periodically transmitting short duration radio frequency energy impulses, a receiver for receiving reflections of said impulses from remote obstacles, a normally blocked signal transmission channel in said receiver, means for unblocking said channel for a short time interval approximately equal to the duration of the transmitted impulses once during the interval between each pair of successive transmitted impulses, signal integrator means for producing a direct voltage from the output of said channel, and means for indicating the magnitude of said voltage.

12. In a radio echo obstacle system including apparatus for periodically transmitting short duration radio frequency energy impulses and a receiver for receiving the reflections thereof from remote obstacles, the method of distinguishing regularly recurring echo signals from randomly occurring noise signals which comprises the steps of, holding the receiver in a normally blocked condition, generating a control pulse whose duration is approximately equal to the transmitted impulses in the interval between transmitted pulses, applying said control pulse to the receiver to render the same operative responsive thereto, integrating the energy received during the unblocked interval of reception, and indicating the magnitude of the energy so integrated.

ALLEN H. SCHOOLEY.

REFERENCES CITED

The following references are of record in the file of this patent:

UNITED STATES PATENTS

| Number | Name | Date |
|---|---|---|
| 1,924,174 | Wolf | Aug. 29, 1933 |
| 2,086,918 | Luck | July 13, 1937 |
| 2,208,422 | Hugon | July 16, 1940 |
| 2,226,706 | Cawein | Dec. 31, 1940 |
| 2,266,401 | Reeves | Dec. 16, 1941 |
| 2,266,668 | Tubbs | Dec. 16, 1941 |
| 2,280,707 | Kell | Apr. 21, 1942 |
| 2,361,437 | Trevor | Oct. 31, 1944 |
| 2,406,316 | Blumlein | Aug. 27, 1946 |
| 2,407,198 | Wolff | Sept. 3, 1946 |
| 2,407,898 | Norgaard | Sept. 17, 1946 |
| 2,408,414 | Donaldson | Oct. 1, 1946 |
| 2,410,233 | Percival | Oct. 29, 1946 |
| 2,416,088 | Deerhake | Feb. 18, 1947 |
| 2,416,895 | Bartelink | Mar. 4, 1947 |
| 2,421,020 | Earp | May 27, 1947 |
| 2,433,838 | Elie | Jan. 5, 1948 |